Dec. 30, 1952

O. BARSTOW 2,624,014

REFRACTOMETER

Filed May 31, 1949

INVENTOR.
Ormond Barstow
BY
Griswold & Burdick
ATTORNEYS

Dec. 30, 1952  O. BARSTOW  2,624,014
REFRACTOMETER

Filed May 31, 1949  4 Sheets-Sheet 3

INVENTOR.
Ormond Barstow
BY
Griswold & Burdick
ATTORNEYS

Dec. 30, 1952     O. BARSTOW     2,624,014
REFRACTOMETER
Filed May 31, 1949     4 Sheets-Sheet 4
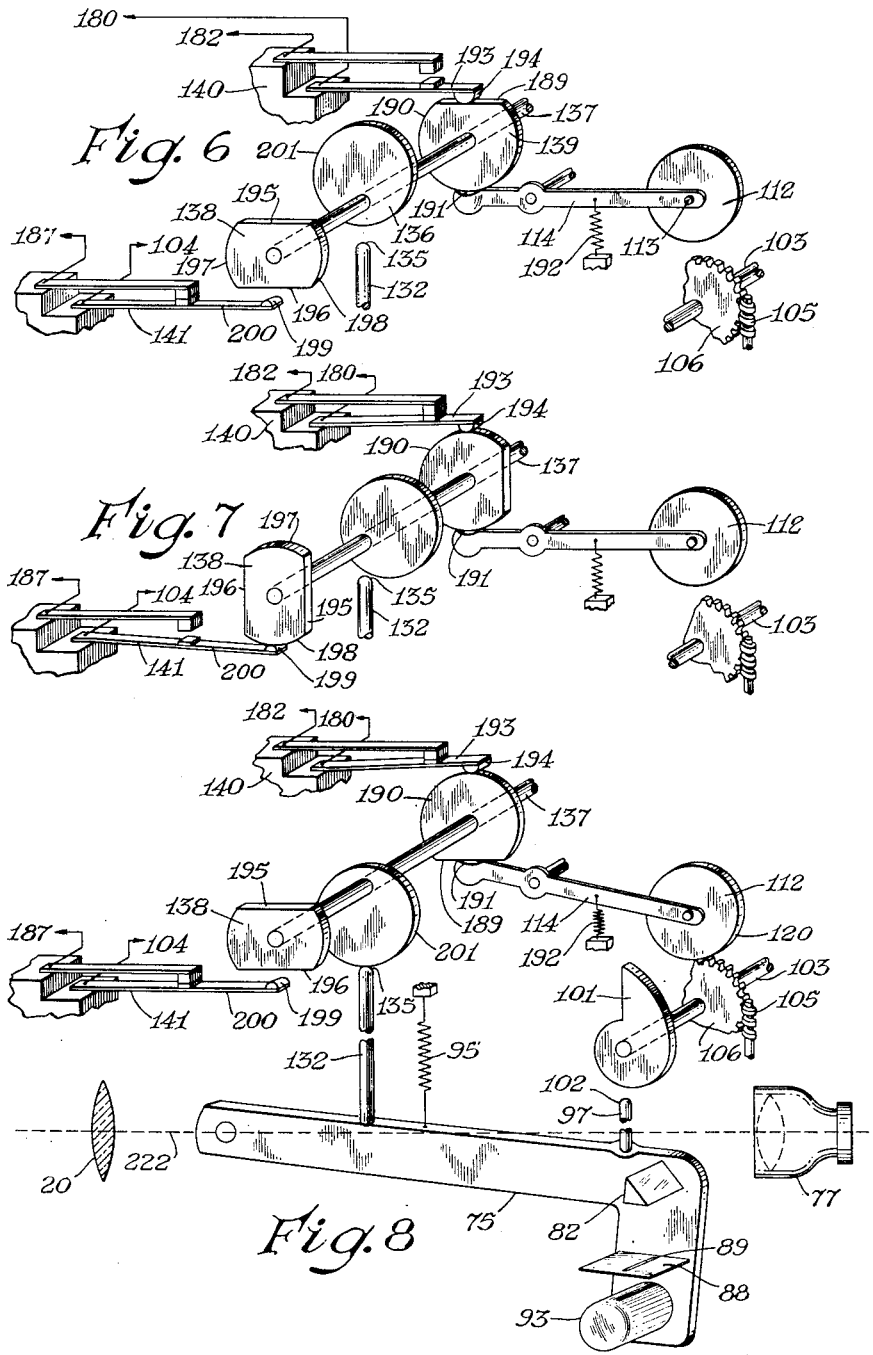
INVENTOR.
Ormond Barstow
BY
Griswold & Burdick
ATTORNEYS Patented Dec. 30, 1952

2,624,014

UNITED STATES PATENT OFFICE 2,624,014

REFRACTOMETER

Ormond Barstow, Midland, Mich., assignor to The Dow Chemical Company, Midland, Mich., a corporation of Delaware Application May 31, 1949, Serial No. 96,329

3 Claims. (Cl. 250—202)

This invention relates to a method of and means for measuring the refractive index of fluid transparent material. It more particularly concerns an apparatus by means of which the index of refraction of a liquid may be automatically and continuously measured and recorded.

The principal object of the invention is to provide a method of and means for measuring the refractive index of a liquid without recourse to visual observation.

Another object is to provide a method of and means for obtaining a continuous measurement of the refractive index of a continuously flowing stream of a liquid and recording the refractive index so measured.

Other objects and advantages will become apparent to those skilled in the art in the following part of the specification.

Referring to the drawings which are for illustrative purposes only,

Fig. 1 is an isometric view, which is partly schematic and cut away to show structure, of the apparatus showing the optical system, the path of refracted light rays, photocell carrying arm and refractive index recorder.

Fig. 2 is an isometric view, which is partly schematic and cut away to show structure, of a preferred form of the apparatus showing the optical system, the path of the refracted light rays, photocell carrying arm, refractive index recorder, and timer mechanism for periodically automatically compensating for variations in the light intensity of the light-dark field boundary of the refracted light rays.

Fig. 6 is a schematic diagram of the position of the timer set cam shaft of Fig. 2 and associated parts when the refractive index is being recorded.

Fig. 7 is a similar view to Fig. 6 showing one of the positions of the timer set cam shaft of Fig. 2 and associated parts when shifting from the recording position to the dark field photocell output current adjustment position.

Fig. 8 is a similar view to Fig. 6 showing the position of the timer set cam shaft of Fig. 2 when automatic adjustment of the dark field photocell output current is being made. In addition, there is shown the photocell carrying arm in the swung down position.

Figure 2:
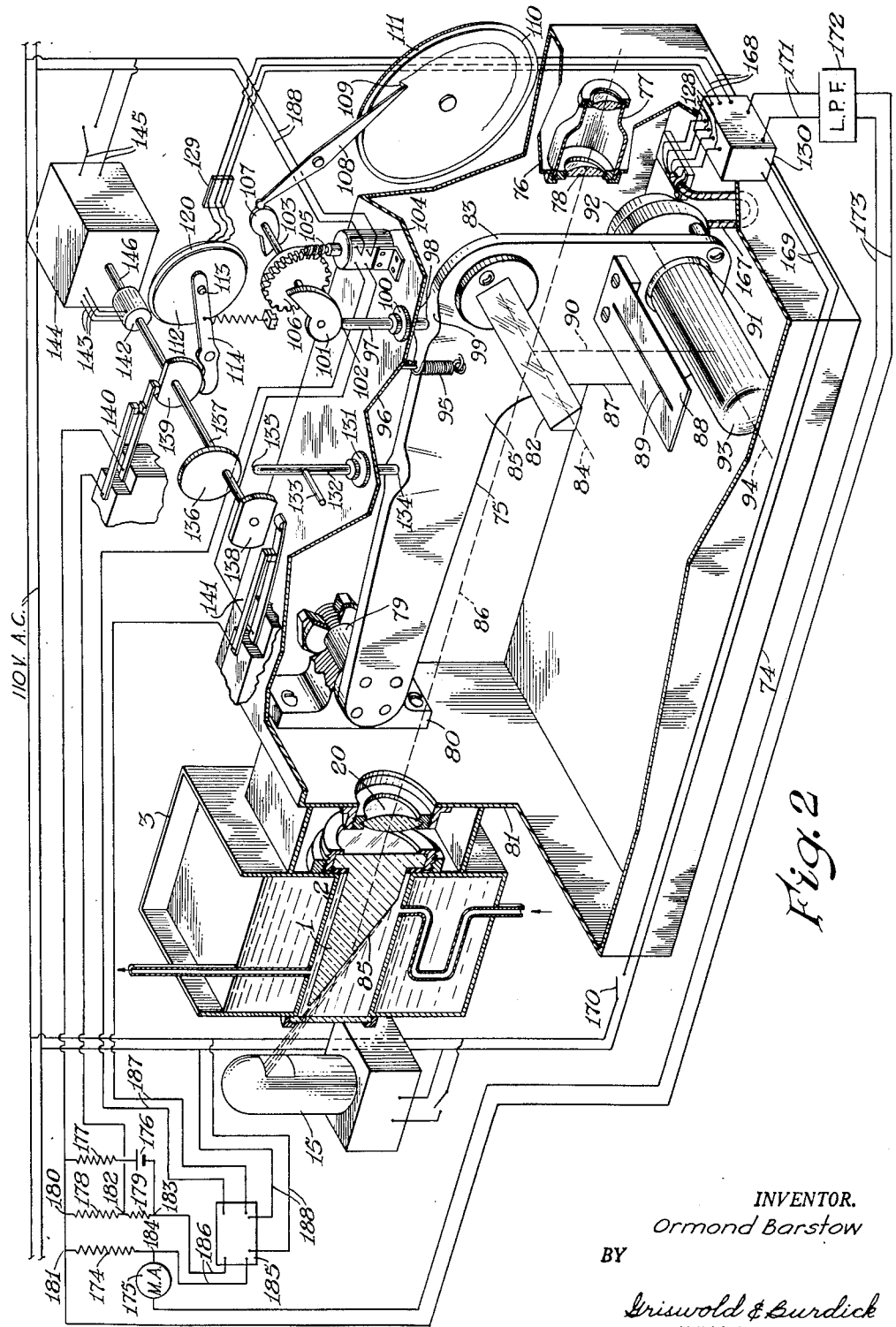

The several parts shown in Figs. 6, 7 and 8 common to Fig. 2 are designated by the same numerals as those used for like parts in Fig. 2.

Figures 9, 10, 11:
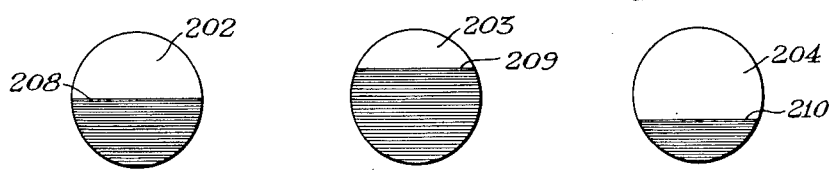

Fig. 9 is a view of the split field of a liquid having a medium index of refraction.

Fig. 10 is a similar view of a split field of a liquid having a low index of refraction.

Fig. 11 is a similar view of a split field of a liquid having a high index of refraction.

Figure 12:
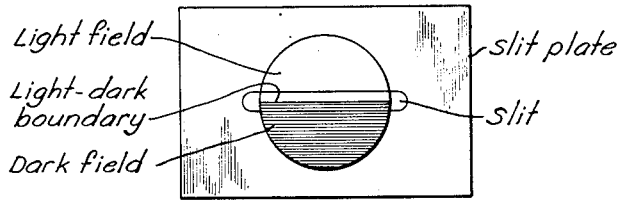

Fig. 12 shows the relationship between the light-dark boundary of the split field and the slit plate when the slit subtends the boundary.

An important use of the apparatus is in making a continuous record of the refractive index of a liquid, the refractive index of which is subject to variations. With the apparatus of Fig. 1, a continuous or intermittent stream of a sample of the liquid, the refractive index of which is to be recorded, is led into the apparatus which then produces the desired record.

Figure 1:
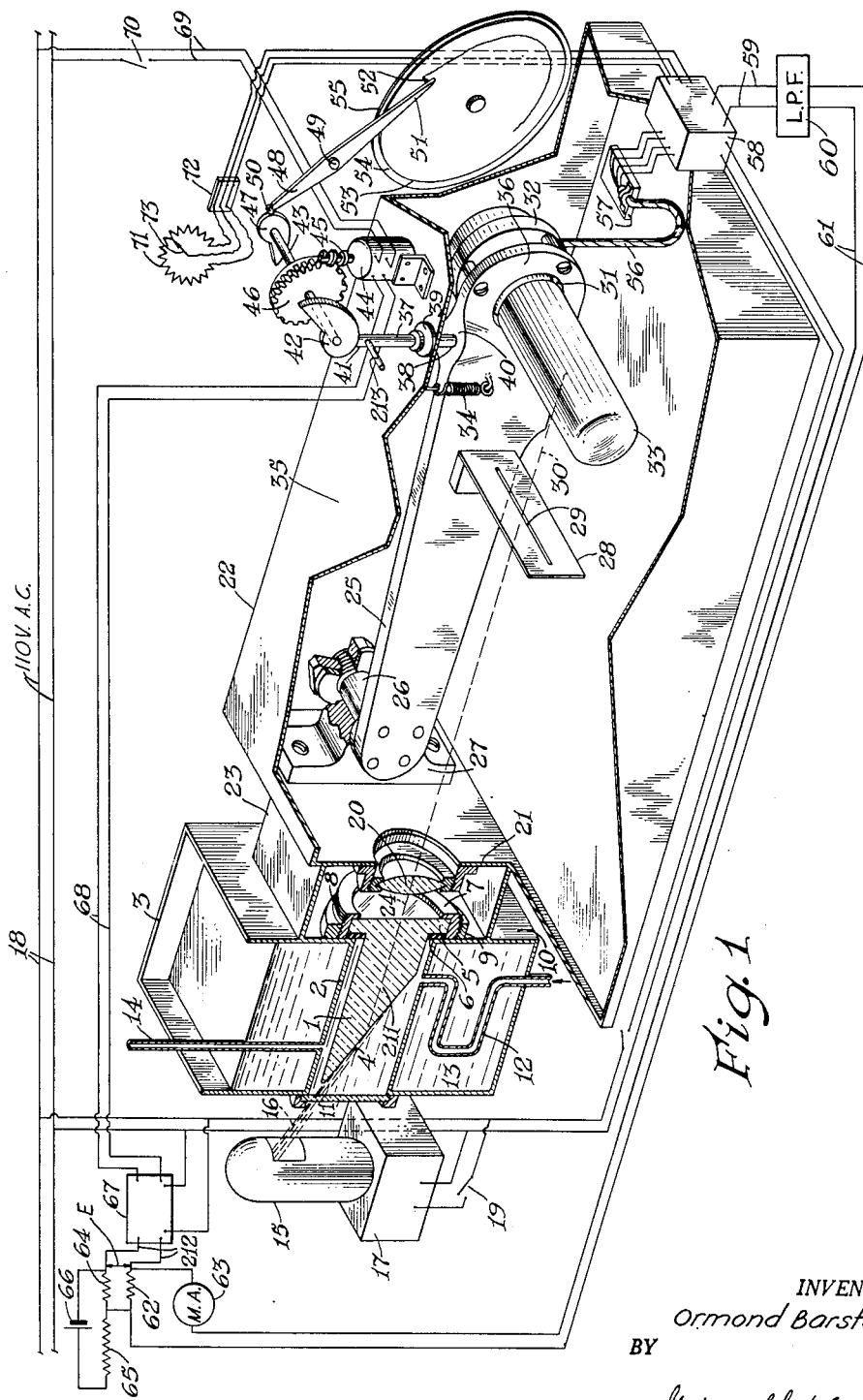

Referring to this apparatus in detail, the embodiment of the invention, shown in Fig. 1, comprises a refraction prism 1 of the Abbé type extending into the sample vessel or cell 2 mounted in a thermostatically controlled tank 3, the thermostatic controls of which have been omitted for simplicity. As shown, the refraction face 4 of the prism faces downward. The prism is provided with a shoulder 5 which is pressed against gasket 6 by retainer 7, the external thread 8 of which engages the internal thread of the boss 9 which is attached to the wall 10 of the tank 3 at one end of the sample cell. The other end of the sample cell is closed by the window 11. Pipe 12 for conveying the sample to the cell 1 passes through the thermostatic bath liquid 13 to the sample cell and acts as a heat exchanger to bring the temperature of the sample to that of the bath. Pipe 14 is provided from the cell for the discharge of sample therefrom. A light source 15, such as a sodium arc light, is placed opposite the face 4 of the prism so that the light beam 16 from the light reaches the face 4 of the prism at grazing incidence as with the conventional dipping refractometer of Abbé. The light source 15 is operated from a suitable power unit 17 connected to current supply lines 18 through switch 19.

In addition to the light source and refraction prism, the optical system comprises the objective lens 20 which is mounted on end wall 21 of the light tight case 22 so that the axis of the lens 20 is in alignment with the axis of the prism 1. The case is maintained in appropriate alignment with the prism by the spacer 23 which forms a light tight enclosure around the light path 24 between the prism 1 and the lens 20.

The inside of the case 22 houses the pivoted arm 25 which is mounted at one end on the shaft 26 journaled in bearing 27 supported by the end 21 wall of the case 22 so that the other end of the arm is free to swing in a plane, preferably vertical, as shown, parallel to and offset from the axis of lens 20. With this arrangement of the prism, lens, and pivoted arm, the plane in which the pivoted arm swings is perpendicular to the plane of the face 4 of the prism 1. The arm 25 carries a light selecting means such as the slit plate 28 in which is formed the narrow slit 29 (0.002 to 0.004 inch in width, for example), the slit being at the focal distance from the objective lens 20. It is also in line with the axis 30 of the objective lens 20 when the arm 25 is in the horizontal position as shown. Although the center line of shaft 26, which is perpendicular to the axis of lens 20, is shown as being offset from the plane of lens 20, it is desirable in general to position either the shaft or the lens so that the axis of the shaft lies in the plane of the lens. When the pivoted end of the shaft is thus mounted, the length of the light path from lens 20 to the slit 29 remains constant while the arm pivots about the shaft 26.

The other end of the arm is provided with an opening 31, and, behind the opening, there is mounted a socket 32. A photoelectric cell 33, the base of which (not shown) extends through the opening, is held in the socket 32. The light sensitive cell (photoelectric cell) is thus arranged on the arm so that the light sensitive elements thereof (not shown) are in a position to receive the light which passes through the slit from the objective lens. The light sensitive elements of the light sensitive cell, the slit, and objective lens are all in a straight line when arm 25 is horizontal as shown.

A tension spring 34, one end of which is fastened to the top 35 of the case 22 and the other to the arm 25, urges the swinging end 36 of the arm upward. The upward movement of the end of the arm is limited by push rod 37, the lower end 38 of which extends through the bushing 39 into contact with the boss 40 on the arm 25. The upper end 41 of the push rod engages the cam 42 mounted on shaft 43, the angular movement of which is controlled by a 2 phase induction motor 44 driving the worm 45 which engages the worm gear 46 on the shaft 43. The shaft 43 also carries the cam 47. An arm 48 is mounted on the pivot 49 so that the cam follower 50 engages the cam 47. The lower end 51 carries the stylus 52. As shown, the stylus 52 is arranged to bear upon a chart 53 mounted upon the face 54 of a dial 55 driven by a clock mechanism (not shown).

In the apparatus thus far described, the photoelectric cell 33 is arranged to control motor 44, and, thus, the vertical swinging movement of the end 36 of the arm 25.

The control of the motor depends upon the characteristics of the photoelectric cell and is best illustrated, as in the drawing, in connection with a photoelectric cell of the multiplier type such as an RCA type 931–A. As shown, the output of the tube is carried by the multiple cable 56 to terminal block 57 thence to the power supply unit 58. The output of the unit 58 is carried by leads 59 to the low pass filter 60 from which it is conveyed by leads 61 through the resistance 62 and milliammeter 63. The voltage drop across resistance 62 is opposed by a predetermined voltage drop across resistance 64 which is connected in series with resistance 65 and a single dry cell 66 or equivalent source of E. M. F. The voltage difference E, if any, is impressed upon the high gain amplifier 67, the output of which is carried by leads 68 to one phase of the windings of the two phase motor 44, the other phase of the motor is connected through leads 69 and switch 70 to the A. C. power lines 18. The sensitivity of the photomultiplier tube 33 is controlled by the voltage divider 71, the three leads of which are connected through a terminal block 72 to the power supply unit 58. By varying the position of the contact arm 73 on the voltage divider, the voltage applied to the elements of the tube 33 is correspondingly varied, thereby varying the degree of gain or sensitivity of the tube.

In Fig. 2, there is shown a modification of Fig. 1 in which the light source 15, prism 1, sample cell 2, thermostatic tank 3, the objective lens 20, and the arrangement of these parts, are the same as in Fig. 1 and bear the same designations. The light tight box 74 is larger although similar to that of Fig. 1, being made to accommodate a larger L-shaped swinging arm 75. In addition in the end 76 of the box opposite to the objective lens 20, is mounted the eye piece 77 having an objective lens 78 on which may be marked a vertical scale, not shown. The arm 75 is mounted at one end of the long leg of the L on the shaft 79 which operates in the bearing 80 mounted on the end 81 of the box in similar fashion to the arm 25 of Fig. 1 so that the other end of the arm may swing in a plane (preferably vertical) which is parallel to and offset from the axis of the objective lens 20, the plane being perpendicular to the plane of the face 4 of prism. As in the case of the arm 25 of Fig. 1, it is desirable to position either the shaft 79 or the lens 20 so that the axis of the shaft lies in the plane of the lens rather than offset as shown for clarity.

A right angle prism 82 is mounted near the swinging end 83 of the arm 75, the axis 84 of the prism being perpendicular to the face 85 of the arm 75. As shown, the prism 82 is thus arranged to be in alignment with the optical axis 86 of the combination of the refraction prism 1 and objective lens 20. Mounted on the short leg 87 of the arm preferably perpendicularly below the right angle prism 82 is the slit plate 88 in which is formed the narrow slit 89 which is similar to slit 29 of Fig. 1. The slit plate is so positioned as to be in a plane parallel to the optical axis 86 with the slit 89 perpendicular to the plane in which the arm swings, and in line with a perpendicular 90 dropped from the intersection of the aforesaid optical axis 86 and prism axis 84 (as shown). The length of the light path from lens 20 to prism 82 and from prism 82 to the slit plate 88 is equal to the focal length of the lens. As shown, the arm 75 is provided with an opening 91 behind which is mounted the socket 92. A photoelectric cell 93, similar to that of Fig. 1, is inserted through opening 91 and is held in socket 92. As so arranged, elements (not shown) of the photoelectric cell 93 are in line with the perpendicular 90, the axis 94 of the cell is horizontal and thus parallel to the slit 89. The arrangement permits light emerging from prism 1 and focused by lens 20 to be reflected by prism 82 through slit 89, which acts as a light selecting means, into the photoelectric cell 93.

A tension spring 95, one of which is fastened to the top 96 of the box and the other to the arm 75, urges the swinging end 83 carrying the photoelectric cell upward. The upward movement of the arm is limited by the push rod 97, the lower end 98 of which engages the upper edge 99 of the arm. The push rod 97 is mounted in bushing 100 in which the push rod is capable of vertical movement. The vertical movement is controlled by cam 101 with which the upper end 102 of the push rod may engage.

As shown, cam 101 is secured to shaft 103, the angular movement of which is controlled by reversible 2 phase induction motor 104 (one phase of which is connected by leads 188 to the power supply lines) whose worm gear 105 engages the worm wheel 106 which is also mounted on shaft 103. The shaft 103 also carries the cam 107 which actuates the pivoted stylus arm 108, the stylus 109 of which is arranged to register on the chart 110 mounted on the dial face 111. The dial face is turned by clock mechanism, not shown.

Figures 3, 4:
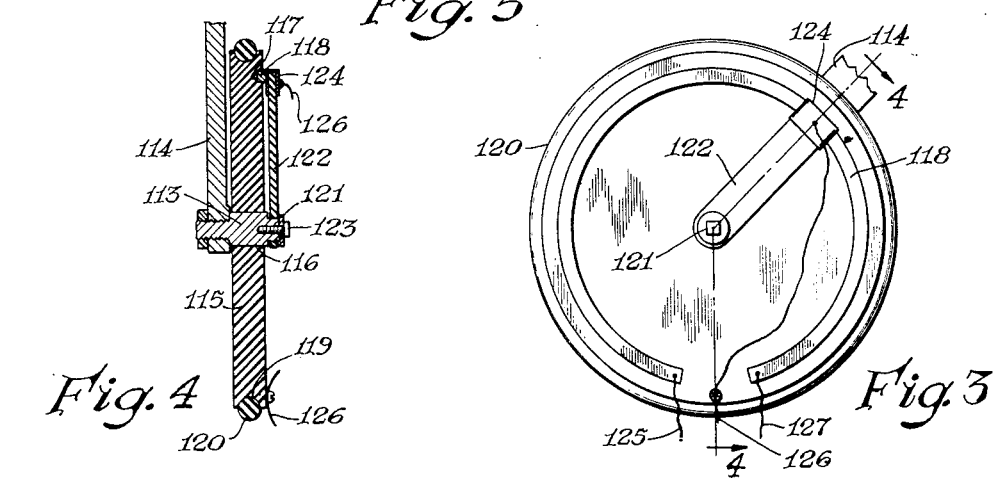
Fig. 3 is a rear elevation of the voltage divider shown in Fig. 2.
Fig. 4 is a cross section on the lines 4—4 of Fig. 3.

For adjusting the sensitivity of the photoelectric cell, there is provided a voltage divider 112 which is mounted and turns on the pivot 113 secured to one end of the pivoted arm 114. As shown in greater detail in Figs. 3 and 4, the voltage divider comprises a disc 115 of insulating material having a central opening 116 to receive the pivot 113 on which the disc is mounted and turns and an annular groove 117 in which is held a bare resistor 118. The edge of the disc 115 is provided with a groove 119 in which is mounted a tire 120 as of rubber. The outer end of the spindle is formed into a squared end 121. Over the squared end 121 of the spindle is placed a contact arm 122 having a square hole, the arm being held in place and prevented from turning by the cap screw 123. The contact arm is formed of insulating material and carries a contact element 124 at its outer end which makes electrical contact with the bare resistor, as shown. Flexible leads 125, 126, and 127 are provided connecting each end of the resistor 118 and the contact element 124 with the terminal block 129 (Fig. 2), from which leads 168 extend to the power supply box 130 which is similar to 58 of Fig. 1. By turning the disc 115, as by allowing the tire 120 to ride upon the worm gear 106, while contact element 124 remains in fixed position relative to arm 114, the element 124 may be made to contact the resistor 118 at any point between the ends connected to leads 125 and 127, thereby varying the voltage between 126 and either 125 or 127.

Again referring to Fig. 2, it will be seen that the box top 96 carries the bushing 131 through which extends the push rod 132 which is provided with handle 133 for manual operation of the rod. The lower end 134 of push rod 132 engages the upper edge 99 of the arm 75. The upper end 135 engages the cam 136 (when turned down) on cam shaft 137 which also carries cams 138 and 139. Cams 138 and 139 operate switches 141 and 140, respectively. By means of push rod 132, the free end 83 of arm 75 may be pushed downward, when desired, to move the right angle prism 82 below optical axis 86 or out of the path of the light from lens 20. With the swinging end 83 of the arm 75 in this lowered position, one may view the light field from prism 1 through lens 29 with the aid of eye piece 77.

Cam shaft 137 is directly coupled to the reversible 2 phase induction motor 142, referred to hereinafter as the shift motor, and turns in unison therewith. The shift motor 142 is connected by three leads 143 to a timer 144 (shown in detail in Fig. 5). The timer 144 is connected to the power supply by leads 145. The timer 144 is controlled by the shift motor shaft 146 extending from one end of the shift motor 142.

Figure 5:
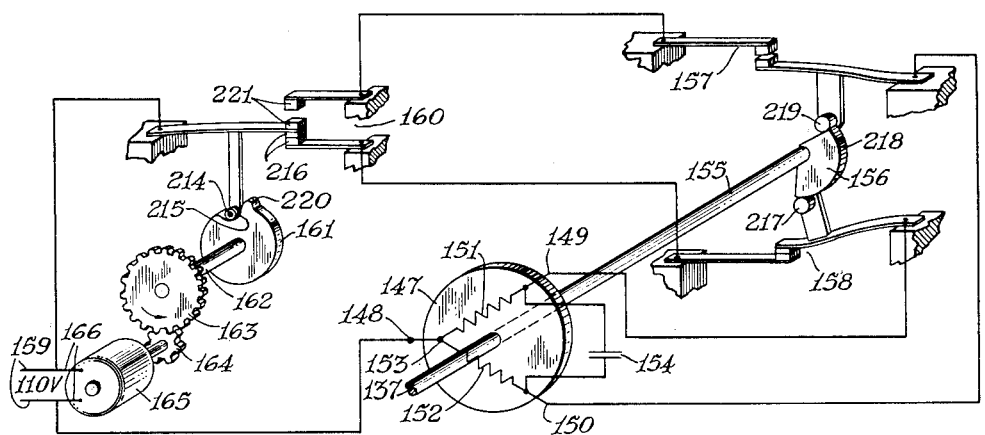
Fig. 5 is a schematic diagram of the timer mechanism of Fig. 2.

Referring to Fig. 5, there is shown the circle 147 which schematically represents the shift motor 142 of Fig. 2, and the three leads 148, 149 and 150 correspond to the three leads 143 of Fig. 2. As indicated by the circle 147, the shift motor 142 is a 2 phase induction motor having field windings 151 and 152 angularly displaced with respect to the circumference of the field of the motor. One end of each winding is connected to a common terminal 153, the other two ends being connected to the condenser 154 which acts as a phase splitter. Shaft 146 (Fig. 2) from the shift motor 142 has an extension 155 (Fig. 5) which carries the cam 156 arranged to operate limit switches 157 and 158. Current is supplied alternately to windings 151 and 152 from the supply leads 159 through the switch 160 which is operated by the cam 161 mounted on shaft 162, the shaft being revolved slowly by means of reduction gears 163 and 164 driven by a synchronous motor 165 connected to the A. C. power supply leads 159 by leads 166.

Again referring to Fig. 2, in connection with the photoelectric cell 93, its output is conveyed by the multiple cable 167 and leads 128 to the power supply box 130 which leads also make connection through the power supply box to leads 168 going to terminal block 129 thence to voltage divider 112. The power supply box 130 is connected by leads 169 through switch 170 to the A. C. power supply lines. The photocell output from the power supply box 130 is conveyed by leads 171 to the low pass filter 172 and thence by leads 173 through resistance 174 and milliammeter 175. This photoelectric cell output circuit is exactly similar to that of Fig. 1. Dry cell 176 is connected in series with the series connected resistances 177, 178 and 179. One end 180 of resistance 179 is connected to one end 181 of resistance 174 and to one side of switch 140. The other side of switch 140 is connected to the other end 182 of resistance 178, whereby resistance 178 is shorted out when switch 140 is closed. End 183 of resistance 179 and end 184 of resistance 174 are connected to the input side of the high gain amplifier 185 by leads 186. The output of the amplifier 185 is connected by leads 187 through switch 141 to one of two phase windings of motor 104, the other phase being connected, as shown, by leads 188 to the A. C. power supply lines.

The parts associated with cam shaft 137 of Fig. 2 exclusive of timer 144 are schematically shown in the series of Figs. 6, 7 and 8 showing various operating positions of the cams and associated elements. The parts of Figs. 6, 7 and 8 which are shown in Fig. 2 are designated by the same numerals in these several figures. Referring particularly to Figs. 6, 7 and 8, it will be seen that cam 139 is provided with a flat portion 189 and a circular portion 190 which portions are arranged to engage the boss 191 on the end of pivoted arm 114 opposite to the end carrying voltage divider 112, the boss being urged into contact with the cam 139 by the tension spring 192. As shown, when the cam 139 is in a position in which boss 191 is in contact with the circular portion 190 as in Figs. 6 and 7, the voltage divider does not turn. When cam 139 is in a position in which the boss 191 engages the flattened portion 189, the pivoted arm 114 tilts allowing the tire 120 of voltage divider to contact gear wheel 106 as shown in Fig. 8, and, in such position, the voltage divider is thereby turned, if gear wheel 106 turns, to adjust the voltage supplied to the photoelectric cell.

The lower spring contact element 193 is provided with the boss 194 which is urged by its springiness into contact with and rides upon the cam 139. When cam 139 is in a position in which the boss 194 is in contact with the flattened portion 189, switch 140 remains open as in Fig. 6. When the cam 139 is in a position in which the boss 194 rides on the circular portion 190, switch 140 remains closed as in Figs. 7 and 8.

Cam 138 is provided with two parallel flattened portions 195 and 196 and two circular portions 197 and 198 each having the same radius. Cam 138 is mounted on shaft 137 so that the flattened portions 195 and 196 are parallel to the flattened portion 189 of cam 139. Boss 199 on the upwardly urged lower spring contact member 200 of switch 141 engages only the circular portions 197 and 198 of cam 138 as when the cam is, for example, in the position shown in Fig. 7. In such position, switch 141 is open. Otherwise, switch 141 is closed as in Figs. 6 and 8, for example, as when boss 199 does not touch cam 138.

Cam 136 is provided with a circular rim 201 and is eccentrically mounted on shaft 137 so that when cam 139 is in the position closing switch 140 cam 136 is turned down so that rim 201 engages the upper end 135 of push rod 132 pushing it into the downward position, as in Fig. 8.

In operation, with either the apparatus of Fig. 1 or Fig. 2, liquid the refractive index of which is to be measured is brought into the sample cell 1 through the pipe 12, and, if continuously flowing, is allowed to overflow through the pipe 14. The sample covers the face 4 of the prism 1. The temperature of the thermostatically controlled bath liquid 13 is suitably adjusted to the temperature at which the index of refraction is to be measured. The pipe 12 which is in contact with liquid 13 brings the temperature of the sample to the desired value while traversing the pipe depending upon the temperature for which the bath is set.

Light (monochromatic) from the light source 15 is directed through the window 11 of the sample cell 1 so as to pass through the sample and reach the face 4 of the prism at a grazing incidence, as shown (Figs. 1 and 2) some light striking the face 4 at a slight angle. With the face of the prism covered with sample liquid and thus illuminated, an observer looking through the eye piece 77 of Fig. 2, for example (the arm 75 being depressed manually as by using handle 133 on push rod 132 so as to provide an unobstructed path for the light emerging from the objective lens to the eye piece), sees a split field of view examples of which are shown in Figs. 9, 10 and 11. In these examples, the unshaded portions 202, 203, and 204, respectively of the circle, represent the bright portion of the field of view while the shaded portions 205, 206, and 207, respectively, represent the dark portion of the field of view. The boundaries represented by lines 208, 209 and 210, respectively between the two portions of the field are usually sharp and with the prism face 4 facing downward as shown, these boundaries are horizontal. The dividing line between the light (upper portion) and dark (lower portion) of the split field is referred to usually by the term light-dark boundary and is delineated by the objective lens bringing the rays of the refracted light beam to a focus.

The position of the light-dark boundary with respect to the axis of the objective lens depends upon the index of refraction of the material of the prism 1, the angle of the prism face 4 with respect to the prism axis 211, and the index of refraction of the sample 16. By a suitable choice of prism 1, the light-dark boundary may be made to split the field into two substantially equal portions, as in Fig. 9, with liquid samples having a medium index of refraction. Samples having a lower index of refraction will raise the light-dark boundary of the split field as in Fig. 10; samples having a higher index of refraction will lower the light-dark boundary as in Fig. 11. The brightness of the light portion of the split field compared to that of the dark portion is a variable but oftentimes is in the order of 10 to 1 and may go as high as 100 to 1.

This invention provides means for automatically measuring or indicating the refractive index of a transparent sample without recourse to visual observations, and involves automatically locating the light-dark boundary formed by bringing to a focus the refracted light emerging from the refraction prism. The visual observations just referred to are for the purpose mainly of facilitating the understanding of the operation of the invention and need not be used until it is desired to note the condition of the field of view.

Referring more particularly to the apparatus of Fig. 1, in use it will be seen that the slit plate 28 is so-positioned (by suitably moving free end 32 of arm 25) that the light rays of the light at the light-dark boundary pass through the slit and impinge upon the photoelectric cell 33. The amount of light which passes through the slit 29 will depend upon the exact position of the slit with respect to the light-dark boundary and the thickness of the beam or width of the slit which is usually made a few thousandths of an inch wide or just sufficient to subtend the light-dark boundary when sharp as in Fig. 12. When the boundary is either at the top of the slit or above it, the amount of light passing to the photoelectric cell is a minimum; when the boundary is either at the bottom of the slit or below it, the amount of light passing to the photoelectric cell is at a maximum. Hence, whether the boundary be sharp or fuzzy, as the slit is moved from the dark field across the light-dark boundary to the light field, the intensity of the light impinging upon the photoelectric cell passes through a range of intensity from a minimum to a maximum. The output of the photoelectric cell varies with the intensity of the light impinging upon it from the slit as well as the sensitivity of the cell. As shown in Fig. 1, this sensitivity may be adjusted by varying the setting of the voltage divider 71 by means of which the potential applied to the photoelectric elements may be increased or decreased, usually through a range of about 800 to 1500 volts, as desired.

With a given sensitivity setting and slit width (light beam thickness), the output of the photoelectric cell is proportional to the brightness of that part of the light-dark boundary coincident with the slit, and produces a specific voltage drop across resistance 62. The value of this specific voltage drop when reached thus becomes the means to indicate when the slit 29 coincides with the light-dark boundary, and the position of the slit with respect to the axis of the lens becomes a measure of the refractive index of the sample. The milliammeter 63 also then indicates a specific reproduceable reading depending on the characteristics of its circuit. The voltage drop across resistance 62 is opposed by a bucking voltage produced by dry cell 66 in series with the voltage divider formed by resistances 64 and 65. The resulting unbalance voltage E, if any, across leads 212 is the algebraic difference between the voltage drop across resistance 62 and resistance 64 and its magnitude and direction depend upon the magnitudes of the output voltage of the photo tube and the bucking voltage. This unbalance voltage E is applied to the input of amplifier 67 through leads 212. The amplifier 67 is essentially an A. C. amplifier with input stage supplied with a synchronous vibrator fed with the unbalance voltage E. The output of the amplifier is an A. C. voltage which is either in phase or 180° out of phase with the voltage of lines 18 depending on the polarity of the unbalance voltage E, and is applied by leads 68 to one of the 2 phase windings of the induction motor 44. The other winding of motor 44 is energized from the same A. C. lines 18 as the amplifier through leads 69 when switch 70 is closed. This motor, therefore, turns in one direction or the other depending upon the polarity of the unbalance voltage E.

The motor 44, if it turns, drives the worm gear 45 which in turn rotates shaft 43 and the cams 42 and 47. As cam 42 moves, push rod 37 follows and causes the arm 30, carrying slit 29 and photoelectric cell 33, to move either upward or downward according to the direction of rotation of the motor 44. The slit is thus caused to move one way or the other following the movement of the light-dark boundary until the output of the photoelectric cell produces a voltage drop across resistance 62 which just balances the bucking voltage so that the unbalance voltage E becomes zero. When E thus becomes zero, motor 44 stops. At the same time that cam 42 moves, the cam follower 50 of the pivoted stylus arm 48 follows the contour of cam 47 causing the stylus 52 to produce a record on chart 53 which is thereby directly related to the position of the slit with respect to the axis of the lens 20.

By a suitable choice of the resistances 62, 64 and 65, the magnitude of the bucking voltage needed to just balance the voltage drop across resistance 62 when the slit coincides with the light-dark boundary as in Fig. 12 can be ascertained. By using the resistances thus selected motor 44 will come to rest as soon as slit 29 moves into the position coinciding with the light-dark boundary.

When using a photo multiplier tube as the photoelectric cell, its sensitivity may be controlled by the voltage divider 71 as shown which is connected through terminal block 72 by leads to the power supply 58 of the tube. By increasing the voltage applied to the photo tube from the voltage divider 71, the output may be increased, if desired, and thus the magnitude of the unbalance voltage E may be increased. The output of the tube when the slit is in the dark portion of the light-dark field may be adjusted to be from about ¼ to ½, for example, of the output when the slit coincides the light-dark boundary. By thus changing the unbalance voltage, the position of the stylus 52 can be altered so as to be suitably positioned on the chart 53 for making a record. A similar adjustment of the positioning of the stylus can be had by altering the magnitude of the resistance 62.

The position of the stylus, as recorded on the chart, is directly relatable to the refractive index of the sample in contact with the refraction prisms so that the chart may be calibrated by independent measurements of the refractive index of the sample. Because the slit will always be moved by the motor to a point where the slit coincides with the light-dark boundary, the stylus will always produce a corresponding indication of this position and, therefore, produce a direct reading of the refractive index on the chart when calibrated.

It is evident that cam 47 may be given a contour representing any desired function of the refractive index instead of the refractive index itself. In addition, it will be apparent to those skilled in the art that the movement of cam 47, which corresponds to changes in refractive index of the sample, can be arranged to control other controlling devices, and these, in turn, may be used to regulate a process affecting the refractive index of the sample.

It is desirable, from time to time, to adjust the dark field output of the photocell to about ¼ to ½ of the balance output. This adjustment may be and often is necessitated by changes in photocell sensitivity, changes in brightness of the light source, and other changes, if any, in the optical system including the refraction prism 1. An accumulation of foreign matter on the face 4, for example, will cause light from the source to be scattered into the dark field, thereby abnormally increasing its brightness and thus decreasing the contrast between the relative brightness of the light and dark portions of the split field.

In practice, it has been found convenient to make resistance 64 about 12 ohms, resistance 65 about 7500 ohms, and resistance 62 about 300 ohms with a conventional multiplier type photoelectric cell. Inasmuch as a dry cell produces about 1.5 volts, the photocell output current, when the slit coincides with the light-dark boundary, is approximately 8 microamperes, as shown by the milliammeter 63. By pushing down on push rod handle 213 so as to move arm 30 downward and thus move the slit 29 into the dark field, the voltage divider 71 may be adjusted until the milliammeter 63 reads 2 to 4 microamperes as a normal dark field output.

The adjustment of the dark field current output of the photocell is made automatically from time to time by means of the modification shown in Fig. 2 of the apparatus of Fig. 1. In the modified apparatus shown in Fig. 2, the voltage divider 112 (shown in greater detail in Figs. 3 and 4) which replaces the voltage divider 71 of Fig. 1, operates automatically and periodically, the periods of operation being determined by the timer 144 (shown in detail in Fig. 5).

Referring more particularly to Figs. 2 and 5 as to the operation of the timer 144, motor 165, which is generally operated continuously, rotates cam 161 slowly, for example, at the rate of 1 turn in 10 minutes, through reduction gears 164 and 163. As cam 161 turns cam follower 214 reaches and drops into the depression 215. When cam follower 214 drops into depression 215, contacts 216 close, thereby supplying current to winding 151 of motor 147 through closed limit switch 158 previously closed by motor 147. Motor 147 then quickly turns shafts 137 and 155 one-half turn and the latter turns cam 156 until cam follower 217 passes the curved portion 218 of cam 156 opening switch 158 thereby stopping motor 147. At the same time that switch 158 is thus opened, cam follower 219 rides onto the curved section 218, thereby closing limit switch 157. As cam 161 continues to slowly revolve, as indicated, cam follower 214 rides upon the cam projection 220, thereby closing contacts 221 of switch 169. Switches 157 and 169, being thus closed (switch 158 being then open), and winding 152 is thus energized, motor 147 quickly turns in the opposite direction opening limit switch 157 and closing limit switch 158 after making one-half turn. This sequence of operations continues as long as motor 165 operates.

Thus, shaft 137 periodically makes one-half turn first in one direction and then in the other at the predetermined arbitrary rate of about one-half turn followed by a reversal every 10 minutes. The time between reversals is relatively short and depends upon, as is manifest, the shapes of the depression 215, the projection 220, the cam follower 214, and the angular distance between the depression 215 and projection 220. Cam 156 is so-positioned on the shaft 155 that shaft 137 occupies the position shown in Fig. 8 when cam follower 214 drops into depression 215. In this position, push rod 132 butts against the downwardly turned cam 136, thereby depressing arm 75 so that the slit 89 is moved into the dark field. At the same time, boss 191 following cam 139 rides onto the flat portion 189, thereby tilting the pivoted arm 114 to bring the tire 120 into contact with the worm gear 106 as in Fig. 8. At the same time, boss 194 rides upon the circular portion 190 of cam 139, thereby closing switch 140. With cams 136 and 139 in the positions just mentioned, cam 138 allows switch 141 to remain closed. Switch 141 being closed, permits one of the 2 phase windings (the other being continuously energized from the lines 188) of the balancing motor 104 to be energized from the leads 187 due to the amplified unbalance voltage, if any, across leads 186. This unbalance voltage, if any, in turn is due to the difference in the voltage drop across the resistance 174 and that across resistance 179 (178 being shorted out by switch 140).

As previously indicated, the voltage drop across resistance 179 is determined by resistance 179 plus resistance 177 and is arranged to be just enough to oppose the voltage drop across 174 (178 being thus shorted by 140) when slit 89 is in the dark field so that no current goes to the amplifier through leads 186 and, therefore, no energizing current goes to the one of the two windings of the motor 104. Under such circumstances, the tire 120 of voltage divider disc 115 in contact with worm gear 106 remains stationary along with the worm gear 106 so that the point at which resistor 118 contacts element 124 remains the same and no adjustment of the dark field output of the photocell occurs.

On the other hand, in the event that the voltage drop across 174 is different from that across 179, as when a change in the output occurs of the photoelectric cell, motor 104 will turn in one direction or the other depending upon the polarity of this voltage difference. The worm gear 106, accordingly, then turns the disc 115 of voltage divider 112 through tire 120 when riding on the gear 106 until the voltage applied by the divider 112 to the photo tube changes the output to a value sufficient to produce a voltage drop across resistance 174 that is just balanced by the voltage drop across 179 (178 being shorted out as in Fig. 8). The worm gear 106 in being thus turned, if at all, in balancing the dark field output of the photocell, cam 107 (Fig. 2) attached to shaft 103 also turns, if at all, and moves the pivoted stylus 109, if at all, slightly off the record and this marking, if any, is disregarded.

As cam 161 (Fig. 5) continues to turn, the follower 214 rides up the projection 220, thereby opening contacts 216 and closing contacts 221. Switch 157 being then in the closed position and 158 being open, motor 147 begins to turn shaft 155 and cam 156 until cam follower 219 rides off 218 after ½ turn, thus opening switch 157, which stops the motor 147, and closing the switch 158. The shaft 137 having been thereby turned ½ turn from the position shown in Fig. 8 through the position shown in Fig. 7 to the position in Fig. 6 causes cam 139 to turn so that the boss 191 of the pivoted arm 114 rides onto the circular portion 190, thereby lifting the tire 120 of voltage divider 112 off gear wheel 106. Thus the setting of the voltage divider produced by its riding on the gear wheel 106 is retained when the divider is elevated, as described, from the gear wheel, as shown in Fig. 6, thus completing the automatic adjustment of the dark field output of the photocell.

While cam shaft 137 shifts from the position shown in Fig. 8 to that of Fig. 6, the intermediate position shown in Fig. 7 is attained during which switch 141 is opened, thereby preventing the balancing motor 104 from operating so that the stylus 109 does not wander during the shifting operation.

With the cam shaft 137 in the position shown in Figs. 2 and 6, resistance 178 is no longer shorted out since switch 140 is then in the open position. In addition cam 136 is turned up allowing arm 75 to be raised by spring 95 until the end 102 of the push rod 97 is raised sufficiently to contact cam 101 and the recording of the index of refraction can take place. Then cam 101 operates upon the push rod 97 to determine the position of the arm 75 and therefore the position of the slit 89. The position of the slit with respect to the light-dark boundary then determines the output of the photocell 93. The output of the photocell produces a voltage drop across 174 which is bucked by the voltage drop across terminals 180 and 183. Any difference between these two voltages is amplified by amplifier 185 and impressed upon one of the windings of motor 104 which then turns in one direction or the other depending upon the polarity of the voltage difference, the response of the motor 104 being similar to that when adjusting the dark field output of the photocell. Thus, the motor turns gear 106 and in turn the cam 107 which moves the stylus 109, accordingly. The turning of motor 104 and the consequent movement of the stylus 109 ceases as soon as the output current of the photoelectric cell and the consequent voltage drop across resistance 174 is brought into balance with the fixed voltage drop between the terminals 180 and 183.

While in the embodiments shown of the invention the means for covering the refraction prism face with samples are designed more particularly for use with flowing samples it will be apparent that the sample cell shown may be used with either flowing or static samples. The range of refraction index measurement of the refractometer will vary with the choice of prism, length of the light path between the objective lens and the slit plate and other factors. Ordinarily with any one conventional refraction prism the range is equivalent to a change of about 0.05 in the magnitude of the refractive index.

The apparatus has a number of advantages among which may be mentioned that it is capable of continuous operation, ordinarily requiring no attention other than changing charts, supplying stylus ink and occasional lubrication; changes in the refractive index of the samples are quickly manifest by the stylus or decord on the chart, there being little time consumed by the mechanism in positioning the slit-carrying arm so that the slit is quickly positioned at the boundary of the light-dark field; accumulations of foreign matter on the face of the refraction prism are easily detected and removed by unscrewing the ferrule 7 and removing the prism from the sample cell as when the light-dark field boundary becomes fuzzy rather than sharp due to dirt on the prism face. The stylus reading is easily calibrated at any time by comparing its recording with that obtained with a sample of known refractive index.

I claim:

1. A refractometer including a stationary light refracting prism for refracting a beam of light, having a light receiving surface and a light emergent surface, said light receiving surface being adapted to be covered by a sample the refractive index of which is to be obtained; a light source opposite the light receiving surface adapted to direct a beam of light through the sample onto the light receiving surface at grazing incidence to produce a refracted light beam, said refracted light beam having a dark boundary on being brought to a focus; an objective lens adapted to bring to a focus the refracted light beam so as to delineate the said dark boundary; light sensitive means adapted to receive light from the focused light beam thereby to produce an electrical output in proportion to the intensity of the light received; light limiting means in fixed space relation to the said light sensitive means adapted to be positioned in the path of the rays of light passing to the light sensitive means to limit the light received by the light sensitive means to the light at the said dark boundary; and means operable in response to changes in the output of the light sensitive means to maintain the light limiting means at the aforesaid dark boundary and the light sensitive means in the said path of said rays of light whereby the output of the light sensitive means is held substantially constant.

2. A refractometer including a light refracting prism for refracting a beam of light, having a light receiving surface and a light emergent surface, said light receiving surface being adapted to be covered by a sample the refractive index of which is to be obtained; a light source opposite the light receiving surface adapted to direct a beam of light through the sample onto the light receiving surface at grazing incidence to produce a refracted light beam, said refracted light beam having a dark boundary on being brought to a focus; an objective lens adapted to bring to a focus the refracted light beam so as to delineate the said dark boundary; an arm having one end pivoted near the lens and the other end free to swing in a plane perpendicular to the aforesaid boundary; light sensitive means adapted to receive light from the focused light beam thereby to produce an electrical output in proportion to the intensity of the light received; light limiting means mounted on the arm near the swinging end at a distance from the lens equal to the focal length of the lens, said light limiting means being adapted to limit the light received by the light sensitive means to the light at the said dark boundary; and means operable in response to changes in output of the light sensitive means to position the swinging end of the arm so as to maintain the light limiting means at the aforesaid dark boundary and the light sensitive means in the path of the said focused light beam whereby the output of the light sensitive means is held substantially constant.

3. A recording refractometer for making a continuous record of the index of refraction of a liquid including a sample vessel adapted to contain a sample of the liquid; a light refracting prism having a light receiving surface in the vessel and adapted to be covered by the sample and a light emerging surface outside the vessel; a light source outside the vessel adapted to direct a beam of light through the sample onto the light receiving surface at grazing incidence to produce a refracted light beam emerging from the prism, said refracted light beam having a dark boundary on being brought to a focus; a lens having its axis in alignment with the axis of the light refracting prism, said lens being mounted adjacent to the light emerging surface of the light refracting prism so as to bring to a focus and delineate the said dark boundary; an arm having one end pivoted near the lens and laterally offset from the axis thereof, the other end of said arm being adapted to swing describing an arc in a plane parallel to the axis of the lens, said plane being perpendicular to the plane of the light entering surface of the light refracting prism; a slit plate mounted on the arm near the swinging end at a distance from the lens equal to the focal length of the lens, said slit plate having a narrow slit parallel to the said dark boundary; a photoelectric cell mounted on the arm in a position to intercept light rays coming through the slit plate from the lens; and motor driven means connected to the swinging end of the arm, operable in response to changes in output of the photoelectric cell, to maintain the position of the slit at the said dark boundary.

ORMOND BARSTOW.

REFERENCES CITED

The following references are of record in the file of this patent:

UNITED STATES PATENTS

| Number | Name | Date |
|---|---|---|
| 1,471,342 | Logan | Oct. 23, 1923 |
| 1,905,251 | Styer | Apr. 25, 1933 |
| 2,108,410 | Perry | Feb. 15, 1938 |
| 2,226,677 | Vikhman | Dec. 31, 1940 |
| 2,283,036 | Bohn | May 12, 1942 |
| 2,336,550 | Kruper | Dec. 14, 1943 |
| 2,421,854 | Seaman | June 10, 1947 |
| 2,445,044 | Stamm et al. | July 13, 1948 |
| 2,483,102 | Pierson | Sept. 27, 1949 |
| 2,529,030 | Latchum | Nov. 7, 1950 |
| 2,534,769 | Hart | Dec. 19, 1950 |